United States Patent [19]

Upp et al.

[11] Patent Number: 4,598,396

[45] Date of Patent: Jul. 1, 1986

[54] DUPLEX TRANSMISSION MECHANISM FOR DIGITAL TELEPHONES

[75] Inventors: Daniel C. Upp, Southbury; William G. Bartholomay, Seymour, both of Conn.

[73] Assignee: ITT Corporation, New York, N.Y.

[21] Appl. No.: 596,328

[22] Filed: Apr. 3, 1984

[51] Int. Cl.$^4$ .................. H04B 1/56; H04B 1/52; H04J 15/00; H04L 5/14

[52] U.S. Cl. ........................ 370/27; 370/24; 370/28; 179/170 NC; 179/170 D

[58] Field of Search ............ 370/24, 27, 28; 179/170 R, 170 D, 170 NC

[56] References Cited

U.S. PATENT DOCUMENTS

| | | | |
|---|---|---|---|
| 3,172,959 | 3/1965 | Burns et al. | 179/170 D |
| 3,936,602 | 2/1976 | Korver | 370/27 |
| 3,987,253 | 10/1976 | Pipitone | 179/170 NC |
| 4,163,878 | 8/1979 | Hashemi | 179/170 NC |
| 4,197,431 | 4/1980 | Vis | 170/170 D |

FOREIGN PATENT DOCUMENTS 1602201 11/1981 United Kingdom ................ 370/24

OTHER PUBLICATIONS

A. Lautier et al, "Full Duplex Line Driver", Oct. 1972, vol. 15, No. 5, IBM Tech. Disc. Bull., p. 1647.

Primary Examiner—Douglas W. Olms
Assistant Examiner—Wellington Chin
Attorney, Agent, or Firm—Peter C. Van Der Sluys

[57] ABSTRACT

A duplex digital transmitter system is disclosed which permits simultaneous digital signal exchange over a two-wire loop. Two sets are provided at the ends of the loop, each having a three-port lattice adapted to separate the transmitted and received digital signals. The digital signals are encoded using a biphase scheme so that they have a zero D.C. component. Therefore the loop is used simultaneously to transmit D.C. power from one set to the other.

4 Claims, 2 Drawing Figures

DUPLEX TRANSMISSION MECHANISM FOR DIGITAL TELEPHONES

BACKGROUND OF THE INVENTION a. Field of Invention

This invention pertains to a device for exchanging data between two terminals simultaneously in both directions on one pair of wires.

b. Description of the Prior Art

Typically a relatively large computer installation or similar data processing center comprises one or more central computers which exchange data with a plurality of peripheral devices such as printers and so forth. Often these devices are several hundreds or thousands of feet away from the computer. Therefore it is common to use a local switching system in a star configuration for providing the means for said transmission. For relatively long transmission lines, duplex digital transmission of voice and data is fairly common. In such transmission various encoding schemes are used such as AMI and HDB-3. However because of actual length of these loops, various problems arise due to the long transmission times, signal attenuation, and reflection. Relatively expensive echo cancelling circuits are necessary to obtain acceptable signals. Furthermore these long loops preclude the use of a single power source for both the host and remote sets. Thus each set must be provided with its own power source.

In a full duplex mode two pairs of wires are commonly used to accommodate a digital signal exchange in two directions, each pair being dedicated to a direction. However providing four wires is rather expensive. Therefore two-wire systems have been proposed in which the wires are in effect dedicated consecutively for a first time interval to data communication in one direction, and for a second time interval they are dedicated to communication in the other direction. In this way messages are exchanged between the respective terminals in a ping-pong fashion. Of course in this configuration the overall data rate of the system can be maintained only by doubling the baud rate of the individual terminals.

OBJECTIVES AND SUMMARY OF THE INVENTION

An objective of the present invention is to provide a transmission system which makes use of two wires for simultaneous bi-directional digital exchange.

Another objective is to provide a system which receives its power from a single location. Other objectives and advantages shall become apparent in the following description of the invention.

A transmission system according to this invention comprises two terminals which are interconnected by a two wire loop. Each terminal is provided with a relatively simple lattice network adapted to separate received signals from the transmitted signals. A biphase encoding scheme is used with a zero D.C. level whereby a separate D.C. voltage may be connected across the two wires to be used as a power source without interfering with the data exchange.

DETAILED DESCRIPTION OF THE INVENTION

The present system is intended for relatively short loops, in the order of 2000 feet, which are fairly frequent in private switching networks. Typically such systems tend to have a "star" configuration and do not need the bridged taps encountered in long, usually public, loops. Such short loops exhibit low loop attenuation, small reflections and since the resistive drop of the loop is relatively low power may be transferred from one end of the loop to the other.

Figure 1:
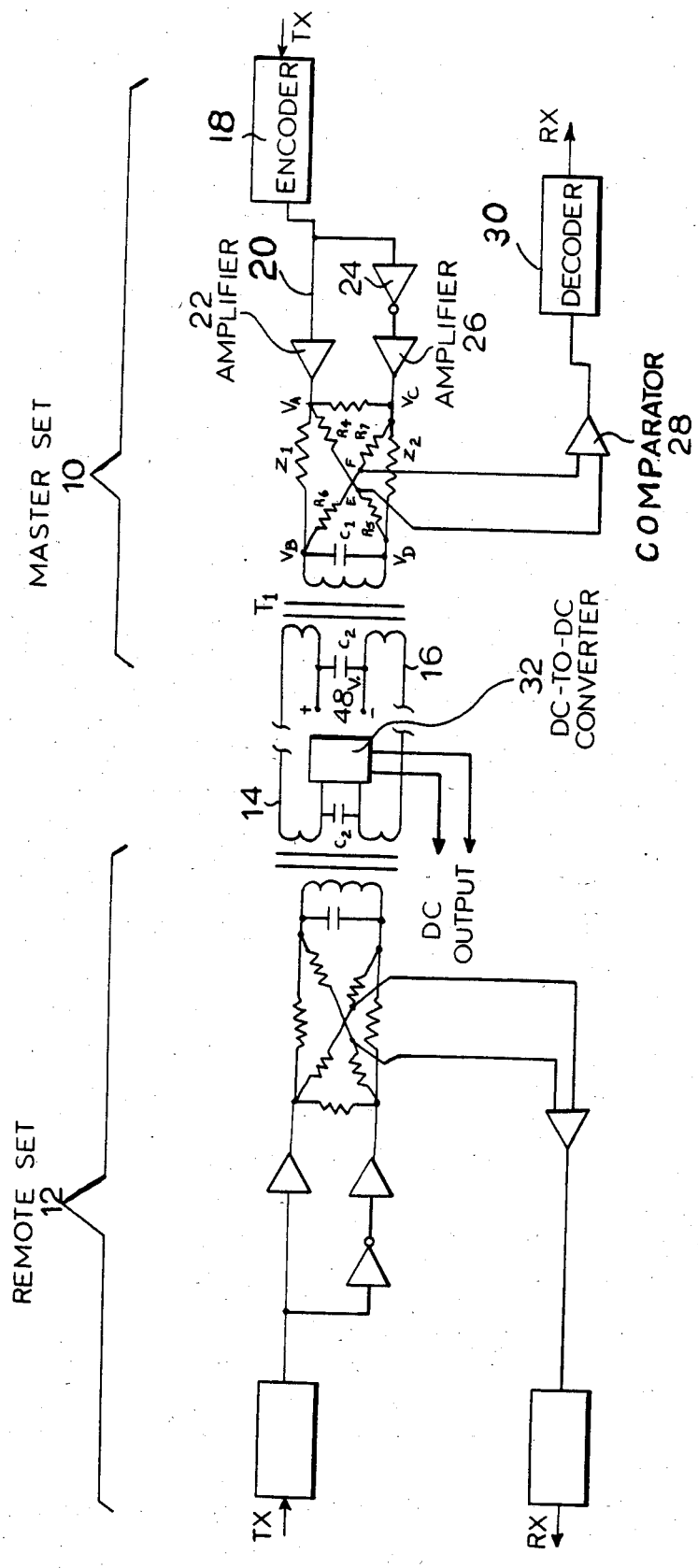
FIG. 1 shows the elements of the present invention.
Figure 2:
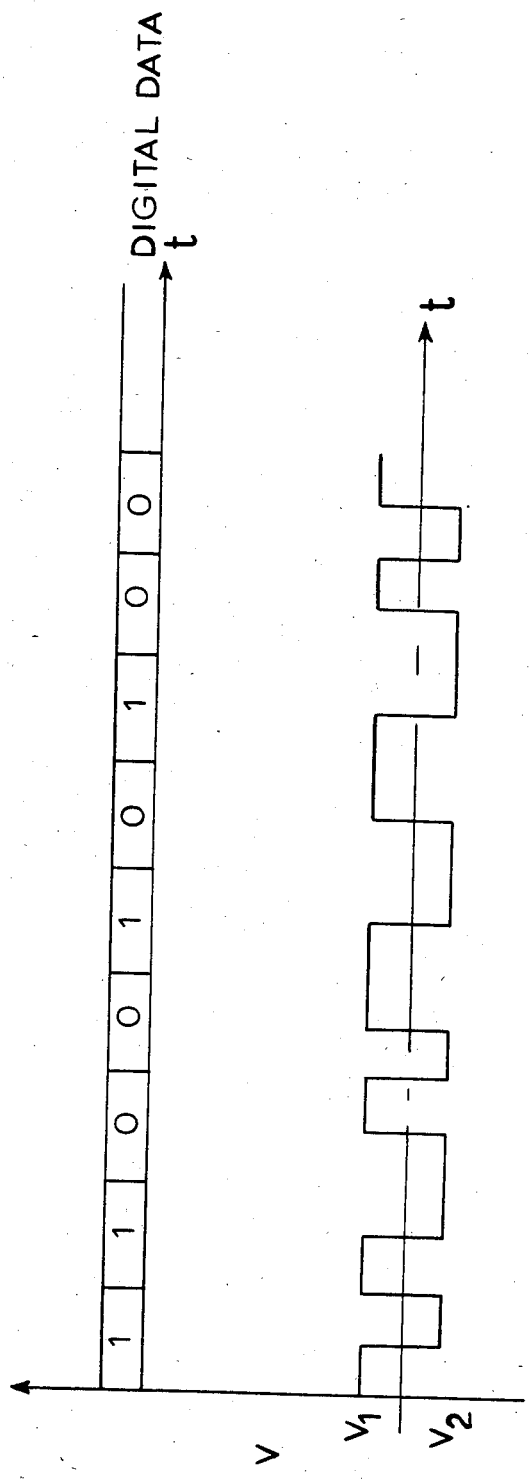
FIG. 2 shows a typical Manchester or biphase encoding scheme.

As shown in FIG. 1, a digital transmission system comprises a host or master set 10, and remote set 12 interconnected by a loop of two wires 14, 16. In master set 10 digital signals are fed into an encoder 18 which generates a corresponding output signal on line 20. Preferably the signals are encoded by using any well-known biphase encoding schemes. One such scheme, known as the Manchester II Code is shown in FIG. 2. According to this code the encoded signal changes between two voltage levels $V_1$ and $V_2$. The transition between these levels determines the digital bit that is being sent. For example, as shown in FIG. 2, a transition from $V_1$ to $V_2$ corresponds to binary "1" while a transition from $V_2$ to $V_1$ corresponds to a binary "0". The transition is timed to occur in the middle of the corresponding bit so that the resulting rectangular pulses have sufficient time to settle, thereby reducing the error rate of the scheme. Furthermore, in this particular application $V_1 = -V_2$ so that the average D.C. level of encoded signals is zero.

The output of encoder 18 is fed to a first amplifier 22. The same output is also inverted by inverter 24 and then fed to a second amplifier 26.

The two amplifier outputs are fed into an impedance network which may be in the form of a lattice network as shown in FIG. 1. The lattice network has two series arms $Z_1$ and $Z_2$ and two diagonal arms each comprising two resistors R4,R5 and R6,R7 respectively.

The central nodes E and F between resistors R4,R5 and R6,R7 respectively are used as inputs to a comparator 28. The lattice is used to transfer transmitted signals from the amplifiers to the transformer T1, and received signals from the transformer T1 to comparator 28. The selection criteria for these resistors are described later. The output of the lattice is connected across the primary coil of a two-to-four wire transformer T1. As shown, the two secondary coils of T1 are coupled by a capacitor C2 and are connected across wires 14,16 of the loop. The transformer is used to isolate the sets from the loop. The transformer also protects the sets from voltage spikes, while for the same time providing longitudinal balance for the loop. The remote set is essentially identical to the host set.

Z1 and Z2 are selected to present to the loop (after transformation by T1) a proper termination impedance of the transformer.

Theoretically it is possible to select the values of the resistors making up the diagonal arms of the lattice in such a manner that the input to the comparator 28 due to the outputs of amplifiers 22 and 26 is negligible. For example if $R4=R7=2R_5=2R_6$ the following conditions exist. The output of amplifiers 22 and 26 is given by $V_A=k$ and $V_C=-k$. If $Z_1=Z_2=Z$ is equal to the impedance of the loop then the transformer impedance is equivalent to 2Z and the voltages at modes B and D are given by $V_B=k/2$ and $V_D=-k/2$. Importantly, the input to transformer T1, $V_{BD}$ is equal to k. Assuming that the resistances of the diagonal arms is made larger than Z, elementary calculations show that $V_E=V_F=0$, nodes E and F being the nodes between resistors R4,R5 and R6,R7 respectively as shown. In other words, with no signals from set 12, the input to comparator 28 of set 10 is zero.

A similar analysis is performed for signals received from set 12. At set 12 if the output at nodes A, C is k, and —k respectively, then in set 12 the input voltage to the transformer is k. Therefore the voltage $V_{BD}$ across the primary coil of the transformer T1 corresponding to the signal from set 12 is equal to nk, where n is a function of the losses in the loop and the transformers. In general n is between 0 and 1 and typically n is between 0.5 and 1. Since the output resistance of amplifiers 22 and 26 is normally much lower than Z, $V_A'=V_C'=0$ and $V_B'=-V_D'=nk/2$ Therefore $V_{F'}$ and $V_{F'}$ are simply determined from the relationship $$D_{F'}=2R/3R \times V_{B'}=nk/3 \text{ and}$$

$$V_{F'}=2R/3R \times V_{D'}=-nk/3$$

Accordingly the voltage across the inputs of comparator 28 is $\frac{2}{3}$ n k.

By superposition, the total voltage across the comparator inputs is equal to the sum of the effects of amplifiers from the two sets. However as shown above, the data transmitted from a particular set does not affect the corresponding comparator.

In practice, of course, perfect impedance matching is impossible. However for relatively short loops it was found that while the data signals are attenuated by a factor of two or less the error signals which result from the improperly matched lines including any echoes, are attenuated by a factor of five or more. The effects of these error signals can be reduced by a proper setting of the offset and hysterises of the comparator.

From the above description it is clear that the comparator of set 10 generates a train of digital encoded signals which is identical to the encoded signals generated by the encoder of set 12 and, vice versa, the comparator of set 12 generates a train of signals which is identical to the train of signals generated by the encoder of set 10. The sets can operate simultaneously on the same loop without interfering with each other. The output of comparator 28 is fed to a decoder 30 which then converts the train of encoded digital signals to a corresponding train of decoded signals. Of course the decoder 30 must be compatible with encoder 18, or in other words they both must use the same coding scheme.

As previously mentioned, the system of FIG. 1 preferable uses the biphase or Manchester II type of coding. However obviously other types of coding which allows clock recovery, minimizes the number of octaves of frequency range, and has no D.C. component, is also suitable. The last criteria is important because it permits the use of a single power supply to be used for both sets. For example, the output of 48VDC power supply could be connected across capacitor $C_2$ of set 10 (as shown in FIG. 1). Since the encoded data signals do not have a D.C. component they are not affected. At set 12 a D.C.-to-D.C converter 32 is provided which converts the 48VDC from the line to any required D.C. level(s). Thus the set 12 does not need its own power supply since it can be run from set 10.

In summary, in each set digital signals are encoded into a train of rectangular pulses which are transferred through a lattice and a hybrid transformer to the transmission lines. At the other end of the lines, the rectangular pulses are transferred through a corresponding transformer and lattice to a comparator. The comparator then generates a respective pulse train for decoding. Both sets are capable of transmitting and receiving data simultaneously over the transmission line so that full duplex simultaneous data exchange is achieved.

We claim:

1. A duplex transmission system for exchanging digital signals simultaneously between two locations, comprising:

a first set disposed at one of said two locations;

a second set disposed at the other of said two locations; and a two-wire loop interconnecting the two sets, each of said sets comprising, a biphase encoder for encoding signals to be transmitted, a biphase decoder for decoding signals that are received, a transformer for transferring transmitted signals to the loop and receiving signals from the loop, an impedance network coupling said transformer, said encoder and said decoder for separating the transmitted and received signals, said biphase encoder and biphase decoder being of the type that produce encoded signals having an average D.C. level of substantially zero, whereby both sets can transmit and receive biphase encoded signals.

2. A duplex transmission system as described in claim 1, wherein the encoder and decoder are of the type that implement a Manchester type code.

3. A duplex transmission system as described in claim 1, wherein one of said sets is a master set having a power source and the system further comprises means for transmitting power from said power source over said loop to said other of the two sets.

4. A duplex transmission system for exchanging digital signals simultaneously between two locations, comprising:

a first set disposed at one of said two locations;

a second set disposed at the other of said two locations;

a two-wire loop interconnecting the two sets, each of said sets comprising, a biphase encoder for encoding signals to be transmitted, a biphase decoder for decoding signals that are received, a transformer for transferring transmitted signals to the loop and receiving signals from the loop, an impedance network coupling said transformer, said encoder and said decoder for separating the transmitted and received signals;

first amplifier means having an input connected to receive the encoded signal from the encoder and a low impedance output for providing the encoded signal;

second amplifier means having an input connected to receive the encoded signal from the encoder and a low impedance output for providing an inverted encoded signal; and said impedance network comprising a first port connected to the output of said first amplifier means, a second port connected to the output of the second amplifier means, a third port connected to said transfer means, a fourth port connected to said transfer means, a fifth port connected to said decoder, and a sixth port connected to said decoder, a first impedance having a value equal to approximately one half the value of the impedance of the loop as seen between ports 3 and 4 is disposed between ports 1 and 3, a second impedance of value equal to that of the first impedance is disposed between ports 2 and 4, a pair of voltage dividers are disposed respectively between ports 1 and 4, and 2 and 3 with said ports 5 and 6 being disposed in said voltage dividers, whereby transmitted signals appear as substantially zero level signals at ports 5 and 6 and received signals from the loop appear at ports 5 and 6 with little distortion because the voltage dividers are more effective due to the low impedance outputs of the amplifier means.

* * * * *